US008631554B2

(12) United States Patent
Wille

(10) Patent No.: US 8,631,554 B2
(45) Date of Patent: Jan. 21, 2014

(54) BLIND RIVET NUT SETTING DEVICE

(75) Inventor: Lothar Wille, Moerfelden-Walldorf (DE)

(73) Assignee: Gesipa Blindniettechnik GmbH, Moerfelden-Walldorf (DE)

(*) Notice: Subject to any disclaimer, the term of this patent is extended or adjusted under 35 U.S.C. 154(b) by 264 days.

(21) Appl. No.: 13/116,666

(22) Filed: May 26, 2011

(65) Prior Publication Data

US 2011/0289762 A1 Dec. 1, 2011

(30) Foreign Application Priority Data

May 29, 2010 (DE) ........................ 10 2010 022 022

(51) Int. Cl.
*B21D 39/00* (2006.01)
*B23P 11/00* (2006.01)

(52) U.S. Cl.
USPC ........................................ 29/524.1; 29/243.5

(58) Field of Classification Search
USPC ................ 29/525.11, 525.06, 524.1, 525.01, 29/243.53, 252, 283.5, 243.54, 243.5, 29/256; 411/361
See application file for complete search history.

(56) References Cited

U.S. PATENT DOCUMENTS 2,789,619 A * 4/1957 Wing et al. .............. 29/243.524
3,555,649 A * 1/1971 Rigot et al. ................ 254/93 R
4,612,793 A * 9/1986 Klein ........................... 72/391.8
4,821,555 A * 4/1989 Kamata et al. ............... 72/391.8
6,212,931 B1 * 4/2001 Solfronk ...................... 72/391.8
6,272,899 B1 * 8/2001 Bentivogli ................... 72/391.8
6,732,563 B1 * 5/2004 Chen ........................... 72/391.8
7,043,808 B2 * 5/2006 Patton ............................ 29/252
7,228,607 B1 * 6/2007 Liu ......................... 29/243.526

FOREIGN PATENT DOCUMENTS

DE 32 15 468 11/1983
DE 698 06 161 2/2003
WO 2008/132576 11/2008

OTHER PUBLICATIONS

German Office Action conducted in counterpart German Appln. No. 10 2010 022 022.1 (Jul. 8, 2011) with English translation.

* cited by examiner

*Primary Examiner* — David Bryant
*Assistant Examiner* — Matthew P Travers
(74) *Attorney, Agent, or Firm* — Greenblum & Bernstein, P.L.C.

(57) ABSTRACT

The device includes pneumatic and hydraulic cylinders, a switch valve connecting the pneumatic cylinder either to an outlet channel or a pressure supply, and an actuating element to switch the switch valve into a second position connecting a control line, open to the environment until closed by reaching a setting limit, to a pressure supply via a throttle and the switch valve. A pressure control valve having a control chamber connected to the pressure supply is structured so that pressures in the control chamber and the control line act on first and second control surfaces in the first and second switch position directions, respectively. The actuating element relieves pressure on the control chamber to move the pressure control valve into the second switch position to connect a motor line and switch channel of the switch valve to the pressure supply, which switches the switch valve into the first position.

19 Claims, 4 Drawing Sheets

BLIND RIVET NUT SETTING DEVICE

CROSS-REFERENCE TO RELATED APPLICATIONS

The present application claims priority under 35 U.S.C. §119 of German Patent Application No. 10 2010 022 022.1, filed on May 29, 2010, the disclosure of which is expressly incorporated by reference herein in its entirety.

BACKGROUND OF THE INVENTION

1. Field of the Invention

The invention relates to a blind rivet nut setting device with a housing in which a tension bolt is arranged in a rotatable and axially movable manner, which projects out of the housing at least with a threaded region, and with a pneumatic/hydraulic pressure booster, which has a pneumatic cylinder and a hydraulic cylinder, wherein a pressure-controlled switch valve is provided, which in a first position connects the pneumatic cylinder to an outlet channel and in a second position connects the pneumatic cylinder to a pressure supply.

2. Discussion of Background Information

Blind rivet nuts are fastening elements that are to be arranged in an opening, for example, in a bore hole of a more or less thin-walled metal sheet. The blind rivet nuts thereby provide an internal thread and thus render possible a screw connection to metal sheets, the wall thickness of which is not sufficient to embody a thread. A blind rivet nut setting device is used to set the blind rivet nut. The blind rivet nut, which in the non-deformed state has a hollow cylindrical rivet shank at the one end of which a radially extending set head is embodied and on the other end of which an internal thread is formed, is thereby screwed onto the threaded region of the tension bolt with the set head first. The internal thread of the blind rivet nut and the external thread in the threaded region of the tension bolt must thereby correspond to one another.

Subsequently, the blind rivet nut is inserted with the rivet shank head first into the opening until the set head contacts. By start up of the blind rivet nut setting device, the tension bolt and thus the thread region are then moved axially backwards from the blind rivet nut and the sheet, whereby a compression of the rivet shank occurs. The blind rivet nut is then held captively in the opening.

To remove the blind rivet nut setting device from the set blind rivet nut, pressure on the tension bolt is relieved and it is rotated in the drill-off direction. The blind rivet nut setting device is then available for a new setting operation.

From DE 698 06 161 T2 a pneumatic/hydraulic rivet device is known, wherein a tension bolt with a threaded region is moved axially with the aid of a pneumatic/hydraulic pressure booster. The pneumatic/hydraulic pressure booster has a pressure supply, to which a system air pressure can be applied. Through the pneumatic/hydraulic pressure booster the system air pressure, boosted several times, is transferred to a hydraulic oil, which acts in the axial direction on the tension bolt. The setting operation is started by actuation of an actuating element. A valve is thereby opened, whereby a piston is displaced, so that the air supply necessary for the setting operation takes place to the pneumatic/hydraulic pressure booster. When a predetermined setting stroke has been carried out or a maximum setting force is achieved, air is released so that a new displacement of the piston takes place. The pneumatic/hydraulic pressure booster is separated from the pressure supply. The air contained in the pneumatic cylinder and compressed by the oil pressure is guided to a pneumatic motor such that it rotates the tension bolt in the drill-off direction.

With this solution, the complete setting operation runs automatically and cannot be interrupted. It is thereby necessary for the actuating element to be released again after a brief pressure, which is ensured by a complex construction of the actuating element. Since the control of the drill-off movement of the pneumatic motor takes place with the air contained in the pneumatic cylinder, a partial release of the air to relieve the pressure on the tension bolt is first necessary before the pneumatic motor can rotate the tension bolt. A relatively long pause is thus produced before the rotating-off with each setting operation, which is often felt to be disruptive.

SUMMARY OF THE INVENTION

Embodiments of the invention provide a device and method that avoid the above-noted disadvantages.

According to the invention, embodiments are directed to a blind rivet nut setting device of the type mentioned at the outset in that the switch valve switches into the second position with the actuation of an actuating element, wherein in the second position a control line that has a passage to the environment is connected via a throttle and the switch valve to the pressure supply, wherein the control line is closed when a setting stroke and/or a setting force is reached, wherein a pressure in a control chamber of a pressure-controlled control valve, which is connected to the pressure supply via a throttle, acts on a first control surface of the control valve in the direction of a first switch position and a pressure in the control line acts on a second control surface of the control valve in the direction of a second switch position, wherein pressure on the control chamber is relieved with the actuation of the actuating element, wherein in the second switch position a motor line and a switch channel of the switch valve are connected to the pressure supply, whereby the switch valve switches into the first position.

Through the actuation of the actuating element, the switch valve thus switches into the second position in which the pneumatic cylinder is connected to the pressure supply so that the setting operation is started. The actuating element can thereby remain pressed. At the same time, because the switch valve is switched into the second position, a control line is connected to the pressure supply, wherein the control line is closed when the setting stroke and/or a setting force is achieved. A completely tight closure of the control line is not absolutely necessary thereby. This leads to an increase in pressure in the control line when the setting stroke and/or the setting force is reached, whereby the pressure-controlled control valve is automatically switched into the second switch position. At the same time, pressure is thereby relieved on the pneumatic/hydraulic pressure booster via the switch valve, and a motor line that leads to a pneumatic motor and drives it in the drill-off direction is connected to the pressure supply. Hardly any time therefore passes between the end of the setting operation and the start of the drill-off operation, wherein the actuating element can remain actuated the entire time. When the actuating element is released, the setting operation stops, which operation is continued when the actuating element is actuated again, wherein a drill-off cannot occur until the setting operation has been fully completed. Incorrect operation is therefore virtually ruled out. With this approach the setting operation is thus not only carried out very quickly, but also very safely. A drill-off before the complete setting of the fastening nut is virtually ruled out.

The pressure supply occurs in particular through a pressure channel, which is embodied in the housing. The pressure supply thereby always takes place with a system air pressure, the level of which, however, is not sufficient to carry out the setting operation. Therefore the system air pressure in the pneumatic/hydraulic pressure booster is transferred boosted in a known manner to a hydraulic oil, which acts on the tension bolt in the axial direction.

Preferably, the first control surface of the control valve is larger than the second control surface. A secure switching of the control valve into the first switch position is ensured thereby when the actuating element is no longer retained and the first vent valve closes.

It is particularly preferred thereby that a bypass valve is arranged between the motor line and the pressure supply, which bypass valve in particular can be actuated manually. With the aid of this bypass valve, the motor line that leads to the pneumatic motor can also be connected to the pressure supply outside the usual setting operation, so that the tension bolt can be rotated in the drill-off direction without a setting operation having to be carried out beforehand. This ensures that the blind rivet nut setting device can be released from the blind rivet nut at any time.

Advantageously, at the same time a first relief valve and a second relief valve can be actuated with the actuating element, wherein pressure on the control chamber can be relieved via the first relief valve and pressure on the switch channel can be relieved via the second relief valve, wherein a restrictor is arranged in particular between the second relief valve and the switch channel. Through the actuation of the actuating element, thus pressure on the control chamber of the control valve is relieved, so that a relief of the first control surface of the control valve also takes place. With an increase in pressure in the control line, which leads to a pressure loading of the second control surface of the control valve, a relatively slight increase in pressure is therefore sufficient for a switching of the control valve into the second switch position. With relief of pressure on the switch channel, the switch valve is switched into the second position by the pressure of the pressure supply, so that the control line and the pneumatic/hydraulic pressure booster are connected to the pressure supply via the switch valve. Through the use of two relief valves, a pure pressure actuation of the switch valve and the control valve is thereby possible.

Preferably, the control line can be closed with a valve device, which is loaded in the open direction by a spring and in the closed direction by an oil pressure. It is preferred thereby that a biasing of the spring is adjustable. This embodiment ensures that the control line is closed by the valve device when a desired oil pressure is reached, which is a gauge of the setting force reached. This then leads to an increase in the pressure in the control line, whereby a pressure load of the second control surface of the control valve takes place, which thereby switches into the second switch position. Through the provision of a spring, the biasing of which is adjustable, the oil pressure at which the control line is closed by the valve device can be predetermined. The maximum setting force with which the blind rivet nut setting device loads the blind nut can thereby be adjusted.

Preferably, the control line can be closed alternatively or additionally by the tension bolt when the setting stroke has been completed. This ensures that an increase in pressure in the control line, and thus a switching of the control valve into the second switch position after the setting stroke has been completed, takes place even when the maximum setting force has not been reached. It is also conceivable to design the blind rivet nut setting device for a specific setting stroke from the start, which then represents the criterion for ending the setting operation.

It is particularly preferred thereby that the setting stroke is adjustable, in particular in a range from 0 to 10 mm. Blind rivet nuts can thus be placed in components of different thickness with the aid of the blind rivet nut setting device. Through the adjustment of the setting stroke, the blind rivet nut setting device is adapted to the respective material thickness, so that a secure setting of blind rivet nuts is also possible with different material thicknesses.

Preferably, a moveable stop is provided for an adjustment of the setting stroke, wherein the control line runs along the stop and the tension bolt bears against the stop with the conclusion of the setting stroke. This represents a relatively simple way of closing the control line, since the control line is guided between the tension bolt and the stop and is closed upon contact of the tension bolt with the stop. A complete seal is not necessary thereby, the achievable increase in pressure needs only to be sufficient for the control valve to switch into the second switch position.

Preferably, the tension bolt has an increase in diameter, for example, a full perimeter flange, for bearing against the stop. This represents a relatively simple way of realizing a relatively large contact surface between the tension bolt and the stop, so that a sufficient seal between the tension bolt and the stop is achieved. At the same time this embodiment is relatively stable, so that the stop or the tension bolt are not deformed even with high tensile forces.

Preferably, the stop is arranged in a tubular sleeve, which can be screwed into the housing, wherein the tension bolt extends through the sleeve. The position of the stop inside the housing can be fixed relatively exactly and easily adjusted due to the sleeve that can be screwed in. This makes a simple adjustment of the setting stroke possible. The stop thereby extends radially inwards inside the sleeve.

Preferably, a locking device or element is provided, with which a rotary motion of the sleeve can be checked. With the aid of the locking means it is ensured that the sleeve is not accidentally moved inside the housing, which would lead to a displacement of the adjusted setting stroke. Since only relatively slight rotation forces act on the sleeve during the normal setting operation, a complete locking of the sleeve by the locking device or element is not absolutely necessary. A checking is sufficient in many cases. Of course, a complete locking can also take place.

Advantageously, the tension bolt projects out of the housing through a nose piece, which is arranged on the housing, in particular is screwed to the housing. The nose piece is thus replaceable and can be adapted, for example, to different tension bolts. By removing the nose piece, a relatively simple replacement or installation of the tension bolt and the tubular sleeve is also possible. The structure of the blind rivet nut setting device is thereby simplified.

Preferably, the tension bolt is embodied in a multiple-part manner, wherein in particular the threaded region is replaceable. Through the replacement of the threaded region, the blind rivet nut setting device can be adapted to different diameters of blind rivet nuts. For example, it is possible to form the threaded region by commercially available screws according to DIN 912, which are connected to the rest of the tension bolt by a corresponding hexagonal connection. The blind rivet nut setting device can thereby be adapted to different diameters of blind rivet nuts in a cost-effective manner.

Preferably, the pneumatic motor is supplied with air with pressure in the setting stroke direction on the tension bolt, whereby the tension bolt is rotated in the drill-on direction.

This makes it possible to screw the threaded region into a blind rivet nut relatively simply and quickly, which is carried out without the actuation of an additional actuating element. The drilling-on by pressure on the tension bolt from outside is described, for example, in DE 3 215 468 C2.

Advantageously, the tension bolt can be moved in the setting stroke direction by an oil piston. The oil piston is thereby acted on with oil pressure in the setting stroke direction by the pneumatic/hydraulic pressure booster. The oil piston can be loaded against the setting stroke direction by the system air pressure, for example, by connection with the pressure supply. When there is a lack of pressure impingement by the pneumatic/hydraulic pressure booster, an automatic return of the oil piston and thus a return of the setting stroke thus takes place.

It is particularly preferred thereby that the tension bolt can be carried along in the setting stroke direction by the oil piston by form closure and can be pressed with a bearing surface on the oil piston against the setting stroke direction by the pressure of the pressure supply. In the setting stroke direction, that is, into the housing of the blind rivet nut setting device, the tension bolt can thus be pressed in from outside, wherein it is released from the oil piston. This movement of the tension bolt can be used to switch a valve, so that the drill-on operation is carried out automatically. However, due to the system air pressure, when the outer load on the tension bolt decreases, it is ensured that the bearing surface of the tension bolt bears against the oil piston again. If the oil piston is now acted on with an oil pressure by the pneumatic hydraulic pressure booster, the oil piston moves in the setting stroke direction, that is, into the housing, and takes the tension bolt with it by form closure. The form closure is produced in that the tension bolt bears against the oil piston with its bearing surface. Relatively high forces can be transferred thereby.

Advantageously, the control valve has a tubular valve element, wherein the pressure supply to the control chamber is carried out through the valve element and the throttle is arranged in the interior of the valve element. An embodiment of this type makes a very space-saving construction possible. The valve element thereby takes over a dual function. On the one hand it serves the pressure supply to the control chamber and accommodates the throttle, on the other hand it takes over the usual switch functions of a control valve. Thus, it respectively provides the corresponding connections for each switch position.

In a preferred embodiment, a channel leads from the control line, through which channel a pressure supply to a third control surface of the control valve takes place, which acts in the same direction as the second control surface. Through pressure on the third control surface, the control valve is thus likewise moved in the direction of the second switch position. This increases the reliability with which the control valve is switched from the first switch position into the second switch position. Even with a relatively slight increase in pressure in the control line or also if a residual pressure still prevails in the control chamber, a switching of the control valve into the second switch position occurs and thus the end of the setting operation.

Preferably, the switch channel is connected to the pressure supply via a throttle parallel to the control valve. This ensures that an adequate pressure prevails in the switch channel which holds the switch valve in the first position even in the case of longer inoperation of the blind rivet nut setting device. The switch valve can then switch from the first position into the second position only when the actuating element is actuated. A defined position of the switch valve is thus always ensured.

Advantageously, the throttle is arranged in an interior of a tubular valve element of the switch valve, wherein the throttle has a smaller opening cross section than the restrictor. The opening cross section of this throttle should also be smaller than the opening cross sections of the other throttles.

Through this embodiment, the space that is necessary anyway for the movement of the valve element can be used for the embodiment of the throttle and the throttled connection between the pressure supply and the switch channel. The installation space required can thus be kept very small.

Embodiments of the invention are directed to a blind rivet nut setting device. The device includes a housing, and a tension bolt rotatably and axially movably arranged in the housing, such that a least a portion of the tension bolt projects out of the housing. The at least a portion has a threaded region. The device also includes a pneumatic/hydraulic pressure booster having a pneumatic cylinder and a hydraulic cylinder, a pressure-controlled switch valve structured so that, in a first position, connects the pneumatic cylinder to an outlet channel and, in a second position, connects the pneumatic cylinder to a pressure supply, and an actuating element structured to switch the valve switch into the second position, so that a control line, which has a passage connected to the environment until closed by reaching at least one of a setting stroke and a setting force, is connected to a pressure supply via a passage throttle and the switch valve. A pressure control valve has a control chamber that is connected to the pressure supply via a control throttle, the pressure control valve is structured so that a pressure in the control chamber acts on a first control surface in a direction of a first switch position and so that a pressure in the control line acts on a second control surface in a direction of a second switch position. The actuating element is further structured to relieve pressure on the control chamber, whereby the pressure control valve is moved into the second switch position to connect a motor line and a switch channel of the switch valve to the pressure supply, which switches the switch valve into the first position.

According to embodiments of invention, the device may further include a first relief valve structured and arranges to relieve pressure on the control chamber, and a second relief valve structured and arranged to relieve pressure on the switch channel. The first and second relief valves can be simultaneously actuatable by the actuating element. The device can also include a restrictor arranged between the second relief valve and the switch channel.

In accordance with other embodiments, the device can also include a valve device, which is loadable in an open direction by a spring and loadable in a closed direction by an oil pressure, wherein the valve device is structured and arranged to close the control line.

According to still other embodiments of the instant invention, the control line may be closable by the tension bolt when the setting stroke is completed.

In accordance with further embodiments, the device can also include a moveable stop structured for adjusting the setting stroke, wherein the control line runs along the stop until the tension bolt bears against the stop when the at least one of the setting stroke and setting force is reached. The device can also include a tubular sleeve in which the movable stop is arranged, wherein the tension bolt extends through the sleeve. The tubular sleeve is connected to the housing through a screwable connection. The device can also include a locking device structured and arranged to prevent rotary motion of the sleeve.

According to other embodiments of the present invention, the control valve can include a tubular valve element, and the control throttle may be located within the tubular valve element. In this manner, the pressure supply can be connected to the control chamber through the tubular valve element.

Moreover, the control valve can also include a third control surface and a channel connected to the control line guides the pressure supply to the third control surface to act in a same direction as the second control surface.

According to other embodiments, the switch channel may be connected to the pressure supply via a switch throttle.

Embodiments of the invention are directed to a method for setting a blind rivet nut. The method includes attaching a blind rivet nut to a tension bolt, guiding the blind rivet nut through an opening in a workpiece, and deforming the blind rivet nut with the above-described blind rivet setting device.

Embodiments of the invention are directed to a method for setting a blind rivet nut. The method includes attaching a blind rivet nut to a tension bolt, guiding the blind rivet nut through an opening in a workpiece, and deforming the blind rivet nut through an axial displacement of the tension bolt. The axial displacement of the tension bolt is achieved by actuating an actuating element, whereby a pressure controlled switch valve moves from a first position to a second position so as to connect a pressure supply to a pneumatic/hydraulic pressure booster having a pneumatic cylinder and a hydraulic cylinder that acts on the tension bolt.

According to embodiments of the instant invention, the method can further include rotating the tension bolt to release the tension bolt from the deformed blind rivet nut.

In accordance with still yet other embodiments of the present invention, the method may also include defining a setting stroke by adjusting a moveable stop. Further, when a portion of the tension bolt contacts the movable stop, an opening of a control line to the environment is closed. Still further, while the control line opening is closed, a pressure in the control line increases to move a pressure controlled control valve from a first control position to a second control position to connect the pressure supply to a motor line. The motor line can be coupled to a rotary device structured and arranged to remove the deformed tension bolt from the deformed blind rivet nut.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
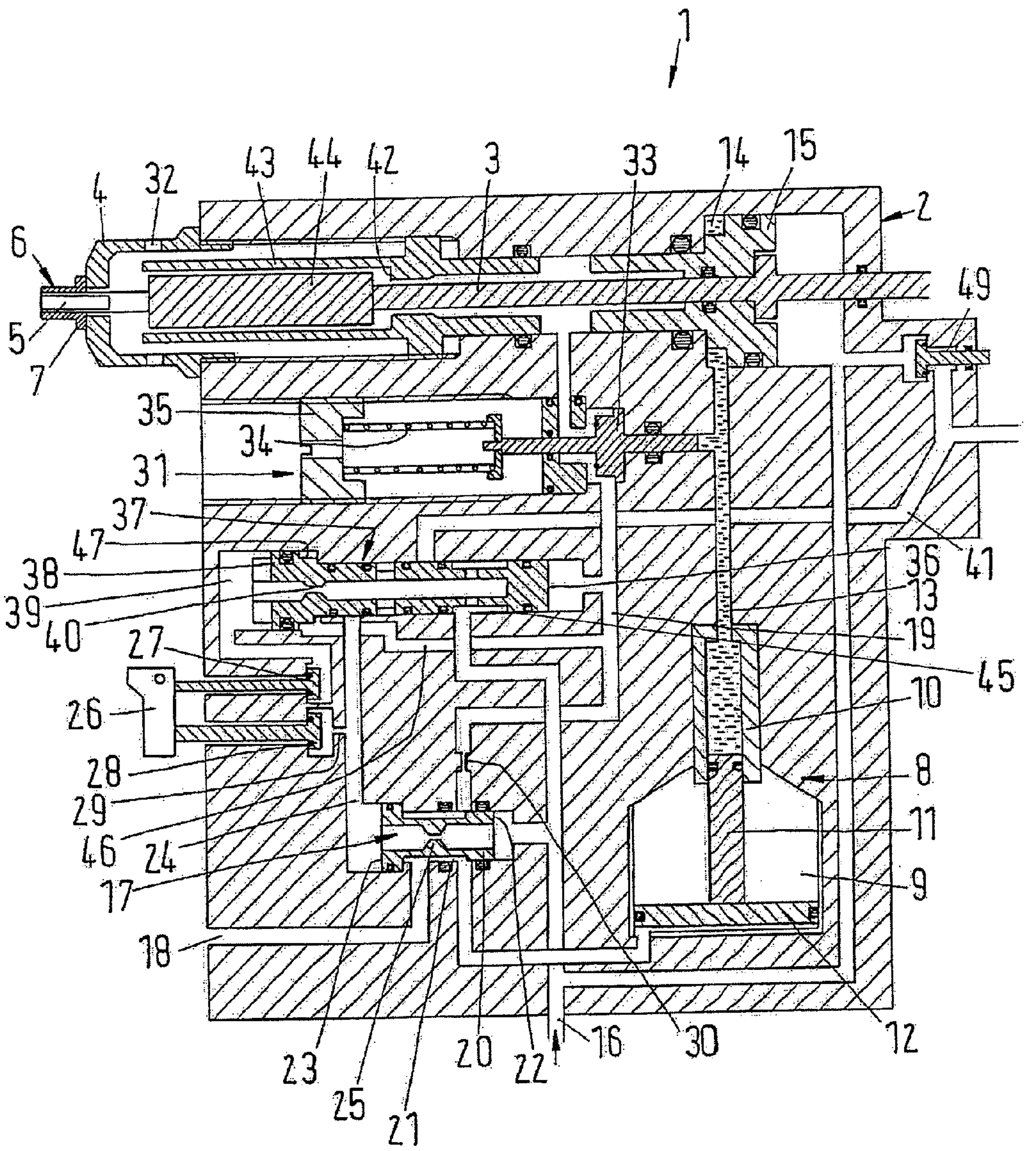
FIG. 1 illustrates a cross section through a blind rivet nut setting device with drilled-on blind rivet nut before the start of the setting stroke.

FIG. 1 shows diagrammatically a blind rivet nut setting device 1 in sectional view. The blind rivet nut setting device 1 has a housing 2 in which a tension bolt 3 is supported in an axially displaceable and rotationally moveable manner. Axially thereby means in the longitudinal direction of the tension bolt 3.

The tension bolt 3 emerges out of the housing 2 through a nose piece 4, which is screwed into the housing 2. At one end that projects out of the housing 2, the tension bolt 3 has a threaded region 5, wherein in the situation shown a blind rivet nut 6 is already drilled on the threaded region 5 of the tension bolt 3.

The drilling-on can be carried out, for example, in that the blind rivet nut 6 is pressed in the axial direction against the tension bolt 3 so that the latter is displaced slightly axially, wherein a valve device (not shown) is actuated thereby such that a pneumatic motor (not shown) is supplied with pressure so that it sets the tension bolt 3 in rotation with its threaded region 5 in the drilling-on direction. The blind rivet nut 6 is then as it were automatically drilled on until it bears against the nose piece 4 with a set head 7.

To set the blind rivet nut 6, this must be guided through an opening in a workpiece and subsequently deformed, wherein the deformation is carried out by an axial tensile movement by the tension bolt 3. For this purpose, the blind rivet nut setting device 1 has a pneumatic/hydraulic pressure booster 8, which has a pneumatic cylinder 9 and a hydraulic cylinder 10. A shaft 11 of a pneumatic piston 12 forms a piston of the hydraulic cylinder 10. Since the surface of a pneumatic piston 12 is much larger than that of the shaft or of the hydraulic piston 11, a large increase in force occurs. The hydraulic cylinder 10 is connected via an oil pressure line 13 to an oil pressure chamber 14, which forms a piston chamber for an oil piston 15. The oil pressure piston 15 is pressed by the pressure in the oil pressure line 13, which is generated by the pressure booster 8, in the setting stroke direction (in FIG. 1 to the right), when the pneumatic cylinder 9 is connected to a pressure supply 16, so that the pneumatic piston 12 is acted on with a system air pressure from the pressure supply 16.

On a side facing away from the oil pressure chamber 14, the oil pressure piston 15 is acted on with the system air pressure of the pressure supply, so that when the pressure booster 8 is not actuated, the oil pressure piston is pressed into the neutral position shown.

In the starting position shown in FIG. 1 before the start of a setting operation, the pneumatic cylinder 9 of the pressure booster 8 is connected via a pressure-controlled switch valve 17 to an outlet channel 18, which is open to the environment. The pneumatic cylinder 9 is thus pressureless.

The switch valve 17 is located in a first position in which not only the pneumatic cylinder 9 but also a control line 19 is connected to the outlet channel 18 via the switch valve 17. For this purpose, a tubular valve element 20 of the switch valve 17 has an annular chamber 21.

The switch valve 17 is loaded in the direction of a second switch position by the system air pressure of the pressure supply 16, which acts on a first control surface 22. In the starting condition, the system air pressure, which on the one hand is enclosed in a switch channel 24 due to previous setting operations, but also by a throttle 25, which is embodied in the interior of the tubular valve element 20 and connects the pressure supply 16 to the switch channel 24, is likewise built up on a second control surface 23, which is larger than the first control surface 22.

Figure 2:
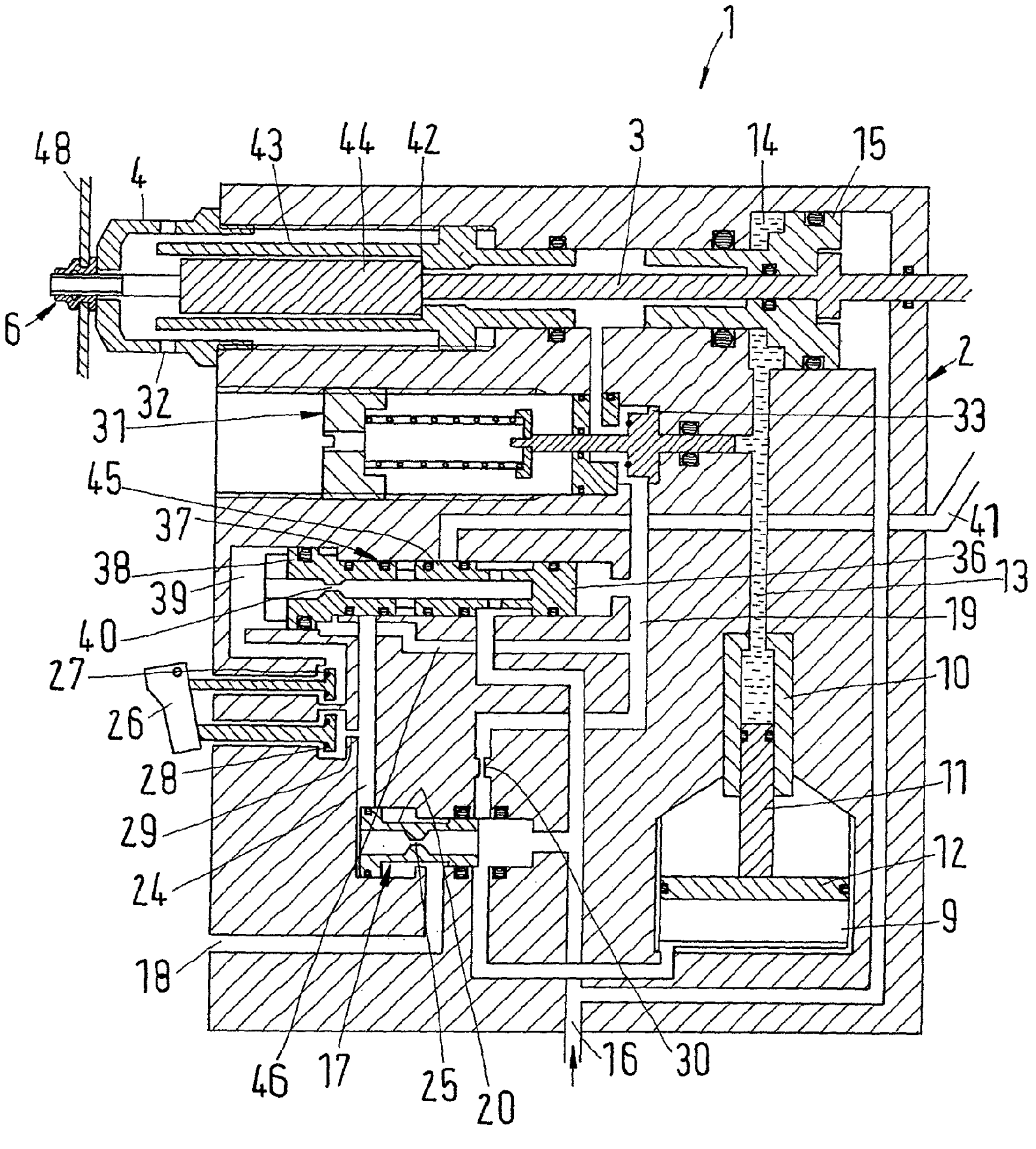
FIG. 2 illustrates the blind rivet nut setting device according to FIG. 1 at the moment when the adjusted setting stroke is reached.

A first vent valve 27 and a second vent valve 28 are opened at the same time by actuation of an actuating element 26. With the opening of the second vent valve 28, pressure is relieved on the switch channel 24 via a restrictor 29, so that a larger pressure acts on the first control surface 22 of the switch valve 17 than on the second control surface 23. The switch valve 17 is thereby switched with the actuation of the actuating element 26. The switch valve 17 thus switches into the second position, which is shown in FIG. 2.

In the second position of the switch valve 17, the pneumatic cylinder 9 of the pressure booster 8 is connected via the switch valve 17 to the pressure supply 16. At the same time the control line 19 is connected to the pressure supply 16, wherein a throttle 30 is arranged between the switch valve 17 and the control line 19. The control line 19 is guided along a valve device 31 and along the tension bolt 3 to the outside, wherein vent openings 32 are provided in the nose piece 4.

In the starting situation shown in FIG. 1, the control line 19 is not closed, so that initially no buildup of pressure in the control line 19 takes place even when the control line 19 is connected to the pressure supply 16.

The pressure in the control line 19 acts on a second control surface 36 of a control valve 37. A pressure in a control chamber 39 acts on a first control surface 38 of the control valve 37, which is greater than the second control surface 36. The control chamber 39 is always connected to the pressure supply 16 via a throttle 40 and can be relieved of pressure via the first relief valve 27. When the actuating element 26 is actuated, the control chamber 39 is pressureless.

In the starting position shown in FIG. 1, the first relief valve 27 is closed, so that the system air pressure prevails in the control chamber 39 and the control line 19 is pressureless, so that the control valve 37 is located in the first switch position shown. In the first switch position, the control valve 37 prevents a connection between a motor line 41 and the pressure supply 16.

For the manual connection, a bypass valve 49 is provided, via which the motor line 41 can be connected to the pressure supply 16 regardless of the position of the other valves. The bypass valve 49 is shown only in FIG. 1 for reasons of simplicity, but it is also provided in the other examples.

The setting operation for setting a blind rivet nut 6 with the aid of the blind rivet nut setting device 1 now takes place as follows. Starting from the starting situation shown in FIG. 1, in which the blind rivet nut 6 is screwed or drilled onto the threaded region 5 of the tension bolt 3 and is inserted into a workpiece opening, an actuation of the actuating element 26 takes place. A relief of pressure of the control chamber 39 thus takes place via the first relief valve 27 and, through the simultaneous opening of the second relief valve 28, a relief of pressure of the switch channel 24. Through the relief of pressure of the switch channel 24, the switch valve 17 switches from the first position shown in FIG. 1 into the second position shown in FIG. 2. In the second position of the switch valve 17, the hydraulic pressure booster 8 is connected to the pressure supply, so that a force is exerted on the pneumatic piston 9 which is transferred via the hydraulic piston 11, the oil pressure channel 13 and the oil pressure chamber 14 to an oil piston 15. The oil piston 15 is thereby moved axially and causes a tensile movement of the tension bolt 3. This leads to a deformation of the blind rivet nut 6, as shown in FIG. 2.

The oil pressure in the oil pressure line 13 acts in the closing direction on a valve element 33 of the valve device 31, wherein the valve element 33 is acted on by a spring 34 in the opening direction. A biasing of the spring 34 can be changed by screwing in an abutment 35.

The axial movement of the tension bolt 3 occurs until an adjusted setting stroke or a desired setting force has been reached. The adjustment of the setting stroke, that is, the distance by which the tension bolt 3 can be displaced, is carried out with the aid of a moveable stop 42, which is arranged in a tubular sleeve 43 which is screwed into the housing 2. Depending on how far the tubular sleeve 43 is screwed into the housing 2, the position of the stop 42 is changed, and the setting stroke is thus adjusted. The tension bolt 3 has an increase in diameter 44, with which the tension bolt 3 bears against the stop 42 when the setting stroke has been reached.

Since the control line 19 is guided outside between the stop 42 and the tension bolt 3, the control line 19 is closed when the diameter enlargement 43 of the tension bolt 3 bears against the stop 42. The control line 19 is thereby connected to the pressure supply 16 via the switch valve 17 and the throttle 30, so that when the control line 19 is closed, a pressure in the control line increases until finally the system air pressure prevails in the control line 19. The start of the rise in pressure in the control line 19 by the tension bolt 3 bearing against the stop 42 when the adjusted setting stroke has been reached is shown in FIG. 2. The increase in pressure in the control line 19 however has just started and is not yet sufficient to press the control valve 37 into the second switch position.

Figure 3:
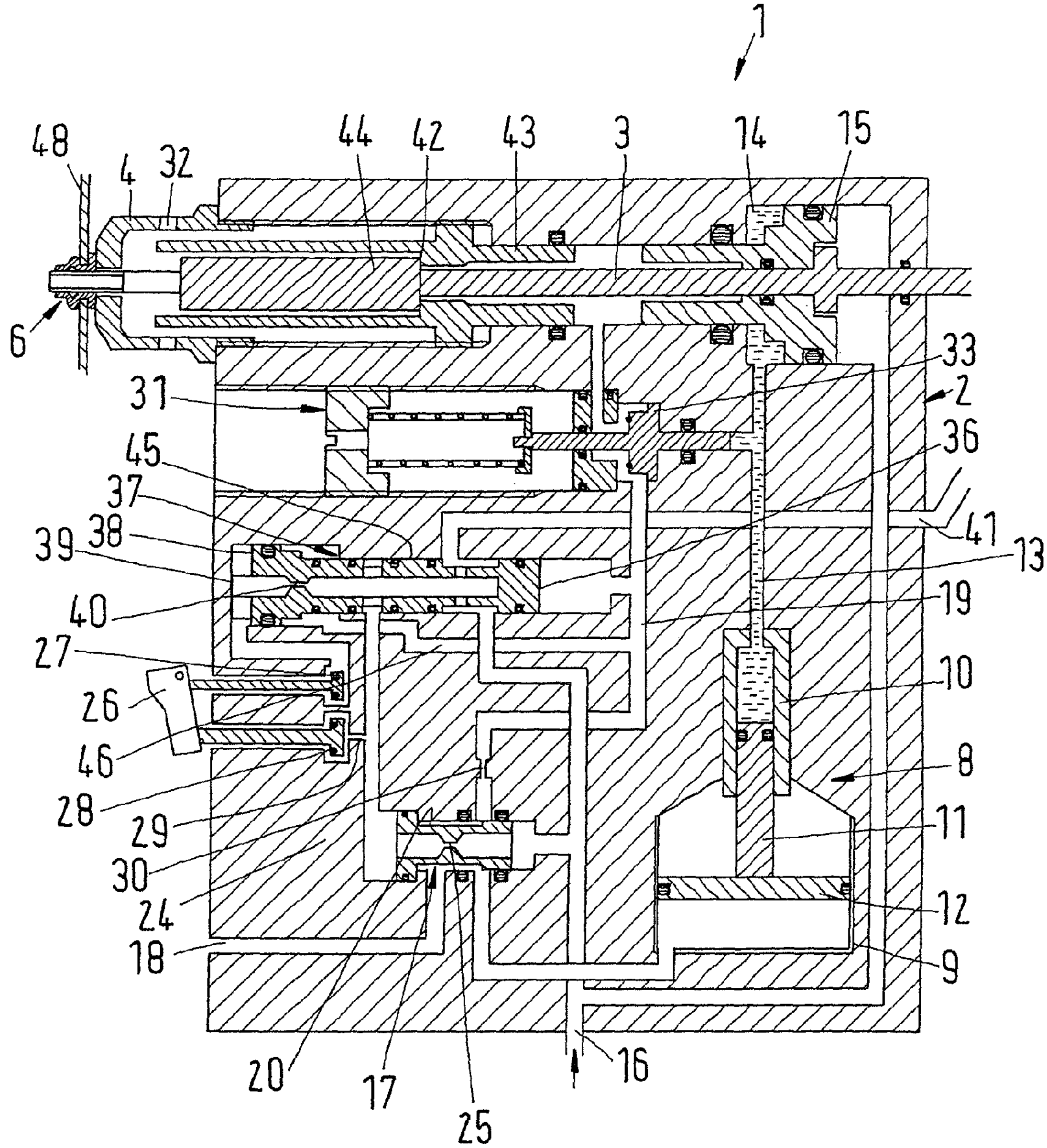
FIG. 3 illustrates the blind rivet nut setting device according to FIGS. 1 and 2 shortly after the adjusted setting stroke is reached and FIG. 4 illustrates a blind rivet nut setting device according to FIG. 1 when the maximum setting force is reached.

FIG. 3 shows the situation at the end of the setting operation and the start of the drill-off operation, in which the motor line 41 is connected via the control valve 37 to the pressure supply 16, so that a pneumatic motor (not shown) rotates the tension bolt in the drill-off direction.

The control valve 37 has been switched into the second switch position by the pressure in the control line 19, which acts on the second control surface 36. On the one hand the connection of the motor line 41 to the pressure supply 16 is produced thereby. On the other hand the switch channel 24 is connected to the pressure supply 16 via the control valve 37, so that the switch valve 17 switches into the first position again in which the pneumatic cylinder 9 is connected to the outlet channel 18 and thus is relieved of pressure. Due to the restrictor 29, the venting of the switch channel 24 via the second vent valve 28 is not sufficient to prevent a buildup of pressure in the switch channel 24 by the pressure supply 16. The switch valve 17 thus switches also back into the first position when the actuating element 26 remains further actuated.

Directly after the control valve 37 or its tubular valve element 45 is switched into the second switch position, the switch valve 17 is thus switched back into the first position and pressure is relieved on the pneumatic/hydraulic pressure booster 8 so that pressure is also relieved on the tension bolt 3. At the same time, the drill-off operation begins through the connection of the motor line 41 to the pressure supply 16. There is therefore only a hardly discernible pause between the end of the setting stroke and the start of the drill-off operation. The blind rivet nut setting device 1 thus works very quickly.

As soon as the actuating element 26 is released after the end of the drill-off operation, the vent valves 27 and 28 close, wherein the system air pressure is built up in the control chamber 39 of the control valve 37, since the control chamber 39 is connected to the pressure supply 16 via the throttle 40.

The control valve 37 thereby switches back into its first switch position. The control line 19 at this time is already connected to the outlet channel 18 via the switch valve 17 and accordingly relieved of pressure. The blind rivet nut setting device 1 is then again in the condition shown in FIG. 1.

In order to already achieve a reliable and quicker switching of the control valve 37 from the first switch position into the second switch position with a slight pressure buildup in the control line 19, a channel 46 leads from the control line 19, which leads to a third control surface 47 of the control valve 37, which acts in the same direction as the second control surface 36.

FIGS. 2 and 3 show how the setting operation is ended by reaching the desired setting stroke. The setting stroke has thereby been adjusted by the corresponding positioning of the stop 42. The valve device 31 has not started to function thereby. Instead, the spring 34 has been biased to the maximum with the aid of the adjustable abutment 35, so that not even a strong increase in the oil pressure in the oil pressure line 13 can lead to a closing of the valve device 31.

Figure 4:
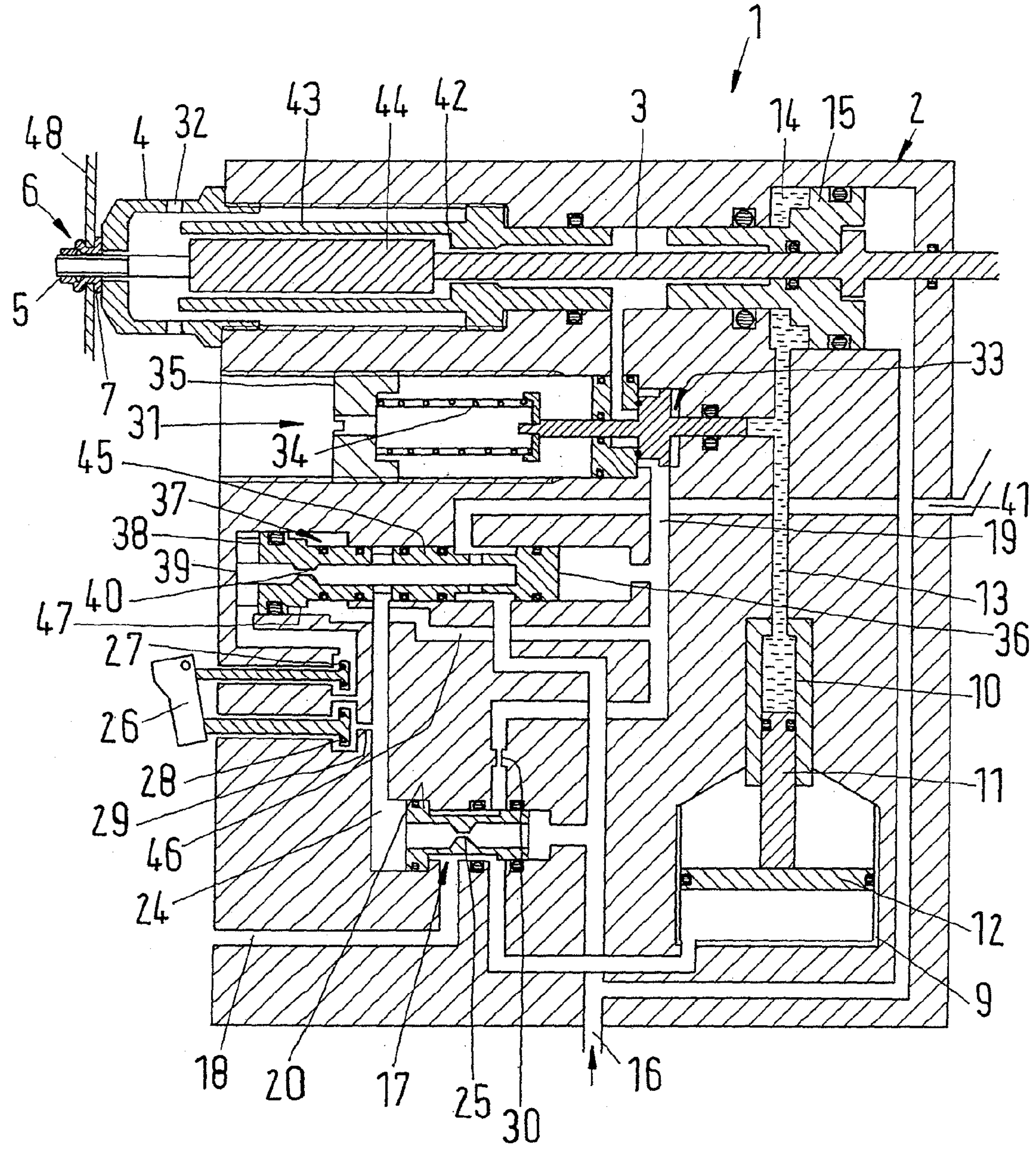

In FIG. 4 the blind rivet nut setting device 1 is now adjusted such that it does not end the setting operation when the desired setting stroke has been reached, but when the desired setting force is reached. The tubular sleeve 43 has been completely screwed into the housing 2, so that the stop 42 is in a position in which it is spaced as far apart as possible from the diameter increase 44 of the tension bolt 3. The maximum setting stroke is thus adjusted which is 10 mm, for example. The setting stroke is variable between 0 and 10 mm depending on the length of the blind rivet nut and the material thickness.

Starting from the situation shown in FIG. 1, the blind rivet nut 6 has been inserted into an opening of a component 48 and the actuating element 26 has been actuated. In a manner already described the tensile operation is then started, wherein FIG. 3 now shows that the desired setting force has been achieved. A gauge of the setting force is thereby the oil pressure in the oil pressure line 13, which acts in the closing direction on the valve element 33 of the valve device 31. The valve element 33 is thereby displaced from the position shown in FIGS. 1 through 3 into the position shown in FIG. 4, wherein the control line 19 is closed by the valve element 33 or the valve element 31. A pressure increase thereby again occurs in the control line 19, which at this time is still connected to the pressure supply 16 via the switch valve 17 and the restrictor 30. This increase in pressure leads to the switching of the control valve 37 into the second switch position, which causes a switching of the switch valve 17 back into a first position. While the pneumatic motor or the motor line 41 are connected to the pressure supply 16 via the control valve 37, a relief of pressure of the pressure booster 18 and thus a relief of the tension bolt 3 take place via the switch valve 17.

The drill-off operation, that is, the unscrewing of the tension bolt 3 out of the blind rivet nut 6, is thereby carried out immediately after the desired setting force has been reached.

The blind rivet nut setting device 1 according to the invention thus works very quickly. The setting operation can thereby be interrupted at any time during the setting operation by releasing the actuating element 26, wherein the setting operation is continued with renewed actuation of the actuating element. When the setting operation therefore has not been correctly carried out, for example, because the actuating element has been released too soon, the drill-off operation is not started. Thus one always has control over whether the adjusted setting stroke or the adjusted setting force, depending on the mode of operation selected, has actually been reached.

Through the use of the system air pressure or through the connection of the motor line to the pressure supply for drilling off, the pneumatic motor can be operated with a high torque, wherein the drilling-off operation runs as long as the actuating element is held. If the actuating element is released too soon, e.g., via an additional bypass valve which is not shown in the drawings, the pressure supply can be guided directly into the motor line, circumventing the control valve, so that even then a further drilling-off is possible.

It is also conceivable to rotate the air motor, e.g., manually and to thus screw the tension mandrel out of the blind rivet nut. However, this is time-consuming as a rule.

No change of the length of the tension mandrel occurs with an adjustment of the stop or of the position of the tubular sleeve inside the housing 2. The adjustment of the stop can thereby be carried out without tools, wherein a scale can be provided so that the adjusted setting stroke can be read from outside.

Due to the use of the system air pressure, the pressure supply for returning the oil piston, an additional return element, for example, a spring, can be omitted. The overall structure is simplified thereby.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A blind rivet nut setting device comprising:

a housing;

a tension bolt rotatably and axially movably arranged in the housing, such that a least a portion of the tension bolt projects out of the housing, the at least a portion having a threaded region;

a pneumatic/hydraulic pressure booster having a pneumatic cylinder and a hydraulic cylinder;

a pressure-controlled switch valve structured so that, in a first position, connects the pneumatic cylinder to an outlet channel and, in a second position, connects the pneumatic cylinder to a pressure supply;

an actuating element structured to switch the switch valve into the second position, so that a control line, which has a passage connected to the environment until closed by reaching at least one of a setting stroke and a setting force, is connected to a pressure supply via a passage throttle and the switch valve; and a pressure control valve having a control chamber that is connected to the pressure supply via a control throttle, the pressure control valve is structured so that a pressure in the control chamber acts on a first control surface in a direction of a first switch position and so that a pressure in the control line acts on a second control surface in a direction of a second switch position, wherein the actuating element is further structured to relieve pressure on the control chamber, whereby the pressure control valve is moved into the second switch position to connect a motor line and a switch channel of the switch valve to the pressure supply, which switches the switch valve into the first position.

2. The blind rivet nut setting device according to claim 1, further comprising:

a first relief valve structured and arranged to relieve pressure on the control chamber;

a second relief valve structured and arranged to relieve pressure on the switch channel, wherein the first and second relief valves are simultaneously actuatable by the actuating element.

3. The blind rivet nut setting device according to claim 2, further comprising a restrictor arranged between the second relief valve and the switch channel.

4. The blind rivet nut setting device according to claim 1, further comprising a valve device, which is loadable in an open direction by a spring and loadable in a closed direction by an oil pressure, wherein the valve device is structured and arranged to close the control line.

5. The blind rivet nut setting device according to claim 1, wherein the control line is closable by the tension bolt when the setting stroke is completed.

6. The blind rivet nut setting device according to claim 1, further comprising a moveable stop structured for adjusting the setting stroke, wherein the control line runs along the stop until the tension bolt bears against the stop when the at least one of the setting stroke and setting force is reached.

7. The blind rivet nut setting device according to claim 6, further comprising a tubular sleeve in which the movable stop is arranged, wherein the tension bolt extends through the sleeve.

8. The blind rivet nut setting device according to claim 7, wherein the tubular sleeve is connected to the housing through a screwable connection.

9. The blind rivet nut setting device according to claim 7, further comprising a locking device structured and arranged to prevent rotary motion of the sleeve.

10. The blind rivet nut setting device according to claim 1, wherein the control valve comprises a tubular valve element and the control throttle is located within the tubular valve element, whereby the pressure supply is connected to the control chamber through the tubular valve element.

11. The blind rivet nut setting device according to claim 1, wherein the control valve further comprises a third control surface and a channel connected to the control line guides the pressure supply to the third control surface to act in a same direction as the second control surface.

12. The blind rivet nut setting device according to claim 1, wherein the switch channel is connected to the pressure supply via a switch throttle.

13. A method for setting a blind rivet nut, comprising:

attaching a blind rivet nut to a tension bolt;

guiding the blind rivet nut through an opening in a workpiece, deforming the blind rivet nut with the blind rivet setting device according to claim 1.

14. A method for setting a blind rivet nut, comprising:

attaching a blind rivet nut to a tension bolt;

guiding the blind rivet nut through an opening in a workpiece, deforming the blind rivet nut through an axial displacement of the tension bolt, wherein the axial displacement of the tension bolt is achieved by actuating an actuating element, whereby a pressure controlled switch valve having a throttle moves from a first position to a second position so as to connect a pressure supply from an outlet channel to a pneumatic/hydraulic pressure booster having a pneumatic cylinder and a hydraulic cylinder that acts on the tension bolt.

15. The method according to claim 14, further comprising rotating the tension bolt to release the tension bolt from the deformed blind rivet nut.

16. The method according to claim 14, further comprising defining a setting stroke by adjusting a moveable stop.

17. A method for setting a blind rivet nut, comprising:

attaching a blind rivet nut to a tension bolt;

guiding the blind rivet nut through an opening in a workpiece, deforming the blind rivet nut through an axial displacement of the tension bolt, wherein the axial displacement of the tension bolt is achieved by actuating an actuating element, whereby a pressure controlled switch valve moves from a first position to a second position so as to connect a pressure supply to a pneumatic/hydraulic pressure booster having a pneumatic cylinder and a hydraulic cylinder that acts on the tension bolt; and defining a setting stroke by adjusting a moveable stop, wherein, when a portion of the tension bolt contacts the movable stop, an opening of a control line to the environment is closed.

18. The method according to claim 17, wherein, while the control line opening is closed, a pressure in the control line increases to move a pressure controlled control valve from a first control position to a second control position to connect the pressure supply to a motor line.

19. The method according to claim 18, wherein the motor line is coupled to a rotary device structured and arranged to remove the deformed tension bolt from the deformed blind rivet nut.

* * * * *